United States Patent
Kuo et al.

(10) Patent No.: US 10,063,330 B2
(45) Date of Patent: Aug. 28, 2018

(54) TRANSMISSION DEVICE, WIRELESS NETWORK TRANSMISSION SYSTEM AND METHOD THEREOF

(71) Applicant: ASUSTEK COMPUTER INC., Taipei (TW)

(72) Inventors: Yen-Ching Kuo, Taipei (TW); Jung-Huang Chiang, Taipei (TW); Ten-Long Deng, Taipei (TW); Hsiao-Ming Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/667,182

(22) Filed: Aug. 2, 2017

(65) Prior Publication Data

US 2018/0048404 A1    Feb. 15, 2018

(30) Foreign Application Priority Data

Aug. 10, 2016   (CN) .......................... 2016 1 0651803

(51) Int. Cl.
  *H04M 1/00* (2006.01)
  *H04B 17/318* (2015.01)
  *H04L 27/04* (2006.01)
  *H04L 27/06* (2006.01)

(52) U.S. Cl.
  CPC ............ *H04B 17/318* (2015.01); *H04L 27/04* (2013.01); *H04L 27/06* (2013.01)

(58) Field of Classification Search
  CPC ...... H04B 17/318; H04B 7/0857; H04B 7/02; H04B 7/0608; H04B 7/0808

USPC ............................................ 455/562.1, 575.7
See application file for complete search history.

(56) References Cited

U.S. PATENT DOCUMENTS

| | | | | |
|---|---|---|---|---|
| 7,352,801 | B2 * | 4/2008 | Ramakrishnan | H04B 7/0808 375/150 |
| 7,406,129 | B2 * | 7/2008 | Yoshida | H04B 7/068 375/260 |
| 8,442,151 | B2 | 5/2013 | Lee et al. | |
| 8,611,960 | B2 * | 12/2013 | Nakao | H04B 7/0619 370/208 |

(Continued)

FOREIGN PATENT DOCUMENTS

| | | |
|---|---|---|
| CN | 101043241 A | 9/2007 |
| TW | 201539864 A | 10/2015 |
| TW | 201628355 A | 8/2016 |

*Primary Examiner* — Sonny Trinh

(74) *Attorney, Agent, or Firm* — Muncy, Geissler, Olds & Lowe, P.C.

(57) ABSTRACT

A wireless network transmission system is provided. The wireless network transmission system comprises a first transmission device and at least a second transmission device. The first transmission device includes a control circuit and a plurality of first antennas. The control circuit is electrically connected to the first antennas. The second transmission device is configured to be communicated with the first transmission device. The first antennas receive wireless signals from the second transmission device. The control circuit is configured to compare signal strength of the wireless signal received by each of the first antennas to generate a comparison result select at least one of the first antennas to transmit or receive the wireless signals according to the comparison result. A wireless network transmission method and a transmission device are also provided.

9 Claims, 4 Drawing Sheets

(56) References Cited

U.S. PATENT DOCUMENTS

| | | | |
|---|---|---|---|
| 8,644,784 B2* | 2/2014 | Yokota | H04B 7/0805 |
| | | | 455/277.1 |
| 2002/0127978 A1* | 9/2002 | Khatri | H04B 7/0413 |
| | | | 455/103 |
| 2005/0113039 A1* | 5/2005 | Tsukamoto | H04B 7/0814 |
| | | | 455/101 |
| 2006/0246854 A1* | 11/2006 | Nakao | H04B 7/061 |
| | | | 455/101 |
| 2015/0289247 A1 | 10/2015 | Liu et al. | |
| 2016/0198474 A1 | 7/2016 | Raghavan et al. | |

* cited by examiner

TRANSMISSION DEVICE, WIRELESS NETWORK TRANSMISSION SYSTEM AND METHOD THEREOF

CROSS-REFERENCE TO RELATED APPLICATION

This application claims the priority benefit of CN application serial No. 201610651803.2, filed on Aug. 10, 2016. The entirety of the above-mentioned patent application is hereby incorporated by references herein and made a part of specification.

BACKGROUND OF THE INVENTION

Field of the Invention

The disclosure relates to a transmission device, a system and a method and, more specifically, to a wireless network transmission device, a system and a method thereof.

Description of the Related Art

With the development of wireless communication technology, wireless communication devices (such as mobile phones, tablets) are popular in daily life. Wireless communication devices include antennas for transmitting and receiving wireless signal. Multi-user multi-antenna (MU-MIMO) technology is one of the commonly-used communication methods, in which a plurality of transmitting and receiving antennas are configured at the transmitting end and the receiving end to transmit and receive the signals. Then, the service quality is improved.

BRIEF SUMMARY OF THE INVENTION

According to a first aspect of the disclosure, a wireless network transmission system is provided. The wireless network transmission system comprises a first transmission device including a control circuit and a plurality of first antennas, and at least a second transmission device configured to be communicated with the first transmission device. The control circuit is electrically connected to the first antennas. The first antennas receive wireless signals from the second transmission device. The control circuit is configured to compare signal strength of the wireless signal received by each of the first antennas, and generates a comparison result. And at least one of the first antennas is selected to transmit or receive the wireless signals according to the comparison result.

According to a second aspect of the disclosure, a wireless network transmission method, adapted to a first transmission device, is provided. The first transmission device includes a control circuit and a plurality of first antenna. The control circuit is electrically connected to the first antenna. The wireless network transmission method comprises: receiving wireless signals by the first antennas of the first transmission device; comparing signal strength of the wireless signal received by each of the first antennas to generate a comparison result; and select at least one of the first antennas to transmit or receive the wireless signal according to a comparison result, by the control circuit.

According to a third aspect of the disclosure, a transmission device configured to be communicated with at least another transmission device is provided. The transmission device comprises: a plurality of first antennas; and a control circuit electrically connected to the first antenna. The first antennas receive wireless signals. The control circuit is configured to compare signal strength of the wireless signal received by each of the first antennas to generate a comparison result and select at least one of the first antennas to transmit or receive the wireless signals according to a comparison result.

In embodiments, the control circuit of the first transmission device is configured to determine and compare the received signal strength of the wireless signal received by each of the first antennas to select at least one of the first antennas to transmit or receive the wireless signals according to the comparison result. The antenna(s) for wireless signal transmissions and receptions with the second transmission device is determined according to the signal strength of the signals at the first antenna of the first transmission device received from the second transmission device. Therefore, without using the beamforming technology, an optimum utilization of the antennas, a higher transmission power and a longer transmission distance are achieved to improve the throughput of the wireless network.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Embodiments of a transmission device, a wireless network transmission system and a method thereof will be described with regard to the accompanying drawings. Same or similar reference symbols denote same or similar components throughout the disclosure.

Figure 1:
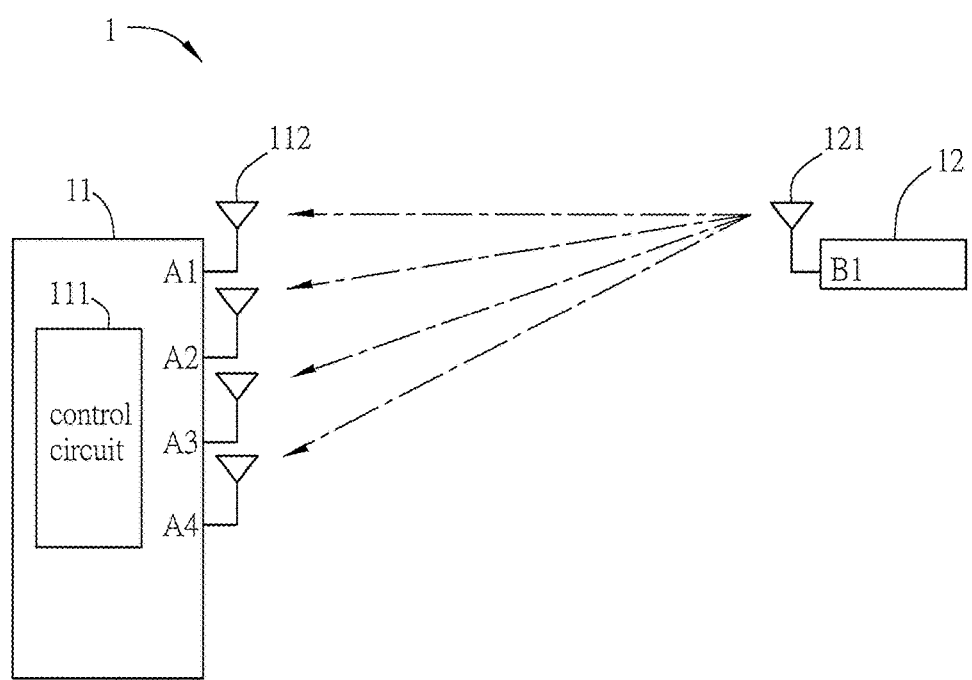
FIG. 1 is a schematic diagram showing a wireless network transmission system in an embodiment.

In an embodiment, a wireless network transmission method is applied in a wireless network transmission system. Please refer to FIG. 1 and FIG. 2. As shown in FIG. 1, in an embodiment, a wireless network transmission system 1 includes a first transmission device 11 and at least a second transmission device 12. The first transmission device 11 and the second transmission device 12 communicate with each other. The first transmission device 11 and the second transmission device 12 transmit or receive the wireless signals with each other by using the MU-MIMO technology, respectively. In the embodiment, the "communicated with each other" refers to the wireless signals are transmitted or received via antennas. In an embodiment, the first transmission device 11 is a wireless access point (AP)/wireless receiver or a wireless network base station, which is not limited herein. The first transmission device 11 serves as a relay point to allow interconnection between wired and wireless devices. In an embodiment, the first transmission device 11 is an internet protocol sharer (IP sharer), a router, or a wireless base station, which is not limited herein. In an embodiment, the second transmission device 12 is a client transmission and reception device, such as a mobile phone.

The first transmission device 11 includes a control circuit 111 and a plurality of first antennas 112. The control circuit 111 is electrically connected to the first antennas 112, respectively. In the embodiment, the number of the first antennas 112 is four (shown as the first antennas A1 to A4) and the number of the second transmission device 12 is one. The second transmission device 12 includes a second antenna 121 (shown as the second antenna B1). In an embodiment, the functions of the control circuit 111 are implemented by a software program. In an embodiment, the functions of the control circuit 111 are implemented by hardware or firmware, which is not limited herein. In an embodiment, the control circuit 111 includes a core control unit of the first transmission device 11, such as a central processing unit (CPU) and other control units such as hardware, software, or firmware. In an embodiment, the first antennas 112 of the first transmission device 11 and the second antenna 121 of the second transmission device 12 are configured to transmit or receive the wireless signals. Then, the first transmission device 11 and the second transmission device 12 communicate with each other via the first antennas 112 and the second antenna 121.

Figure 2:
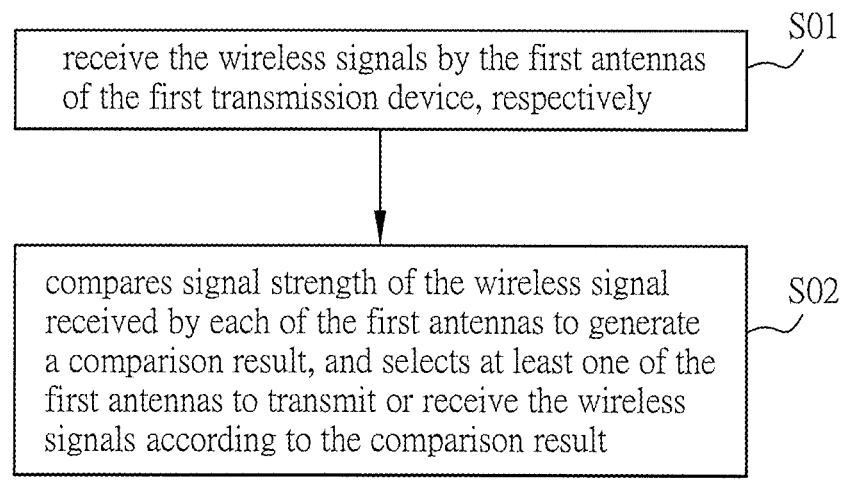
FIG. 2 is a flow chart of a wireless network transmission method in an embodiment.

As shown in FIG. 2, in an embodiment, a wireless network transmission method is applied to the first transmission device 11. The wireless network transmission method includes following steps. In step S01, the first antennas 112 of the first transmission device 11 receive the wireless signals, respectively. That is, each of the first antennas 112 receives the wireless signal from the second transmission device 12. In step S02, the control circuit 111 compares signal strength of the wireless signal received by each of the first antennas 112 to generate a comparison result, and selects at least one of the first antennas 112 to transmit or receive the wireless signals according to the comparison result.

In the embodiment, the control circuit 111 generates a comparison result according to the received signal strength indicators (RSSI) of each of first antennas 112 of the first transmission device 11. The received signal strength indicator of each of the first antennas 112 refers to the strength of the wireless signal received by each of the first antennas 112 and transmitted from the second antenna 121 of the second transmission device 12. The control circuit 111 is configured to compare the signal strength of the wireless signals received by the first antennas 112 to generate a comparison result, and select or assign at least one first antenna 112 with the highest RSSI among the first antennas 112 to transmit or receive the wireless signals with the second antenna 121 of the second transmission device 12 according to the comparing result. In an embodiment, the number of the second transmission device 12 is one, the control circuit 111 selects the first antenna 112 with the highest RSSI to transmit or receive the wireless signals with the second antenna 12. In the embodiment, the control circuit 111 determines that the RSSI of the first antenna A4 is the highest, the control circuit 111 is configured to control the first antenna A4 to transmit or receive the wireless signals with the second antenna 121 of the second transmission device 12, and the rest of first antennas A1 to A3 are not configured to communicate with the second transmission device 12.

Therefore, in the embodiment, under the limited transmission power of the first transmission device 11 (e.g., at the base station), the transmission device, the system and the method provides an optimum utilization of the antennas without using the beamforming technology. As a result, a higher transmission power and a longer transmission distance are achieved to enhance the throughput of the wireless network.

Figure 3A:
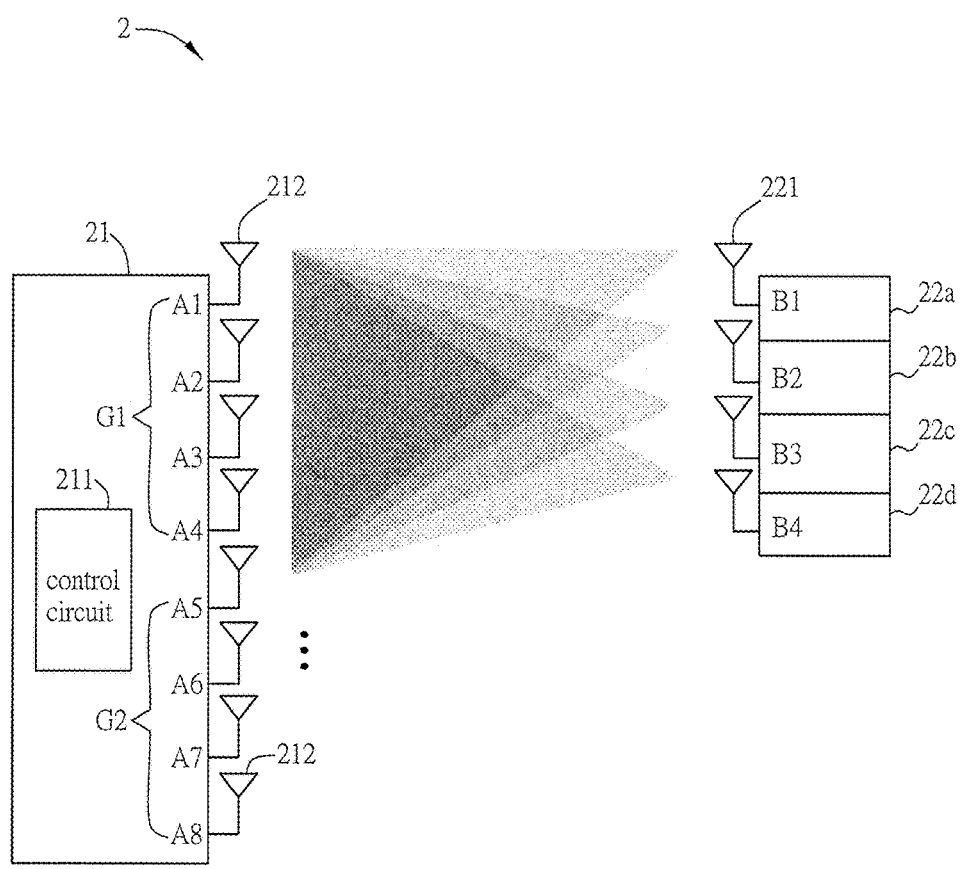
FIG. 3A and FIG. 3B are schematic diagrams showing a wireless network transmission system in an embodiment.
Figure 3B:
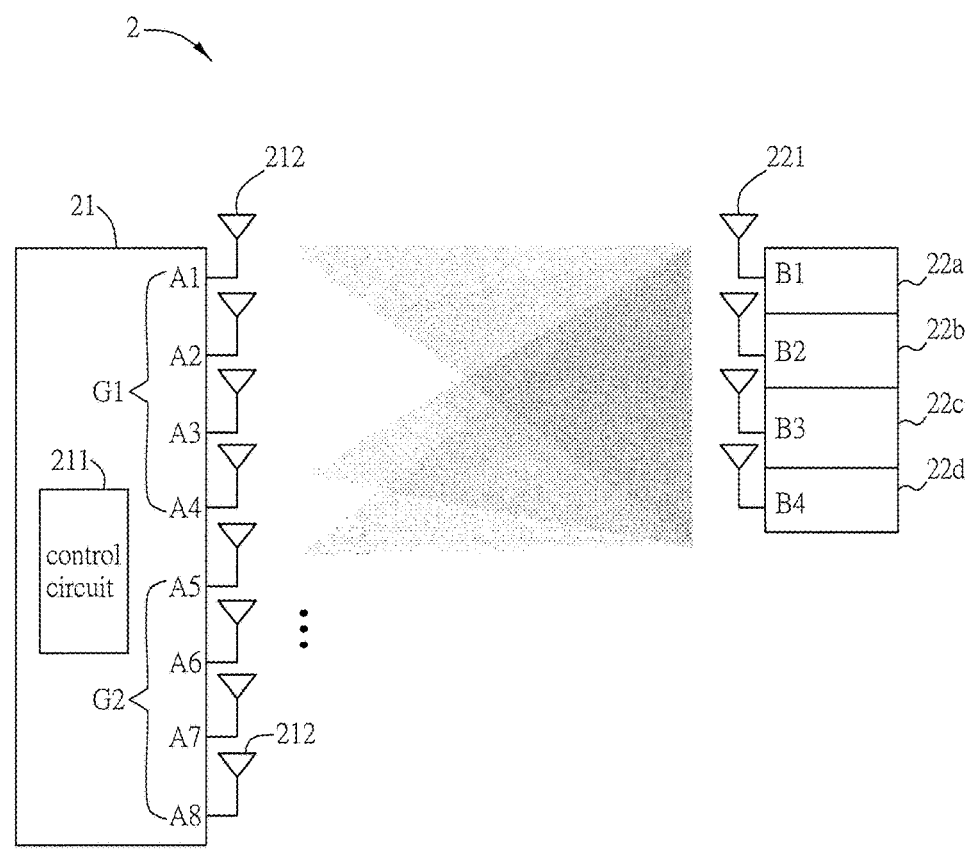

Please refer to FIG. 3A and FIG. 3B. FIG. 3A and FIG. 3B are schematic diagrams showing a wireless network transmission system 2 in an embodiment.

In an embodiment, a wireless network transmission system 2 includes a first transmission device 21 and a plurality of second transmission devices 22a to 22d. The first transmission device 21 and the second transmission devices 22a to 22d are communicated with each other. The first transmission device 21 and each of the second transmission devices 22a to 22d transmit or receive the wireless signals with each other by using the MU-MIMO technology. The first transmission device 21 includes a control circuit 211 and a plurality of first antennas 212. The control circuit 211 is electrically connected to each of the first antennas 212. In the embodiment, the number of the first antennas 212 of the first transmission device 21 is m (in this embodiment, m=8, and the first antennas 212 are denoted by the first antennas A1 to A8), and the number of the second transmission devices 22a to 22d is n (in this embodiment, n=4). Each of the second transmission devices 22a to 22d includes a second antenna 221. The total number of the second antennas 221 (which are denoted by the second antennas B1 to B4) is four. In an embodiment, the first transmission device 21 is a wireless network base station, and the second transmission devices 22a to 22d are client transmission and reception devices, such as mobile phones.

As shown in FIG. 3A, each of the first antennas 212 of the first transmission devices 21 receives the wireless signals from all the second transmission devices 22a to 22d.

In an embodiment, eight first antennas 212 of the first transmission device 21 are divided into a first group G1 and a second group G2. The first group G1 includes four first antennas 212 (i.e., the first antennas A1 to A4 communicates with the second antennas B1 to B4) corresponding to the second antennas 221 to transmit/receive the signals with the second antennas 221. The second group G2 includes the rest of the first antennas 212 (i.e., the first antennas A5 to A8) of the first transmission device 21 that do not communicate with the second antennas.

Similarly, the control circuit 211 is configured to compare the signal strength of the wireless signals received by each of the first antennas 212 to generate a comparison result and select at least one of the first antennas 212 to transmit or receive the wireless signals according to the comparison result. In the embodiment, as shown in FIG. 3B, when the control circuit 211 determines that the signal strength of the wireless signal received by one of the first antennas 212 (e.g., the first antenna A3) in the first group G1 is weaker than the signal strength of the wireless signal received by one of the first antenna 212 (e.g., the first antenna A5) in the second group G2, the control circuit 211 disables the first antenna A3 in the first group G1 to transmit or receive the wireless signals, and the control circuit 211 controls the first antenna A5 in the second group G2 to replace the first antenna A3 to transmit/receive the wireless signals with the second transmission devices 22a to 22d. In other words, when the control circuit 211 detects that the strength of the signals received by one of the antennas (i.e., the first antenna A3) in the first group G1 from the second antennas 221 of the second transmission devices 22a to 22d is weaker than the strength of the signals received by another antenna (i.e., the first antenna A5) in the second group G2 from the second antennas 221 of the second transmission devices 22a to 22d, the control circuit 211 disables the antenna (the first antenna A3 in the embodiment) in the first group G1 to transmit or receive the wireless signals. Instead, the control circuit 211 controls the first antenna A5 in the second group G2 to replace the disabled first antenna A3 to transmit/receive the wireless signals with the second transmission devices 22a to 22d.

In an embodiment, as shown in FIG. 3B, the RSSIs of the first antennas 212 of the first transmission device 21 are A1=a, A2=b, A3=c, A4=d, A5=e, A6=f, A7=g and A8=h, respectively. The signals received by the first antennas 212 are transmitted by the second antennas B1 to B4 of the second transmission devices 22a to 22d. When the control circuit 211 determines that the signal strength at the first antennas A1 to A8 is sequenced as: a>b>d>e>c>f>g>h, the control circuit 211 disables the first antenna A3 to stop the transmission and receiving of the wireless signals (due to e>c), and controls the first antenna A5 to replace the first antenna A3 to transmit/receive the wireless signals with the second transmission devices 22a to 22d (the transmitting end follows the receiving end). Thus, for the first antennas 212 of the first transmission device 21, the control circuit 211 selects four first antennas A1, A2, A4, A5 with better communication capability from the eight first antennas A1 to A8 to have signal transmissions with the second antennas B1 to B4 of the second transmission devices 22a to 22d.

In an embodiment, it is assumed that the total transmission power of the first transmission device 21 is the same as that of a conventional transmission device. Only four first antennas A1, A2, A4, A5 of the first transmission device 21 are configured to have signal transmissions with the second antennas B1 to B4 of the second transmission devices 22a to 22d. In contrast, the conventional transmission device has to use all antennas to transmit signal. Therefore, the transmission power of each of the first antennas A1, A2, A4, A5 assigned by the first transmission device 21 is higher than the transmission power of each antenna of the conventional transmission device. Since signal strength of each antenna of the conventional transmission device is weaker, the conventional transmission device needs to utilize the beamforming technology to enhance signal strength of the antennas. As a result, under the same transmission rate, the signal transmission strength of the first antennas A1, A2, A4, A5 of the first transmission device 21 is higher than that of antennas of the conventional transmission device and the transmission distance of the first transmission device 21 is longer than that of the conventional transmission device. In addition, under the same transmission distance, the data transmission rate of the first antennas A1, A2, A4, A5 of the first transmission device 21 is higher than that of antennas of the conventional transmission device.

In sum, the control circuit of the first transmission device is configured to determine and compare the signal strength of the wireless signals received by each of the first antenna to select at least one of the first antennas to transmit or receive the wireless signals according to the comparison result. The antenna(s) for transmitting/receiving the wireless signal with the second transmission device is determined according to the signal strength at the first antenna of the first transmission device received from the second transmission device. Therefore, without using the beamforming technology, an optimum utilization of the antennas, a higher transmission power and a longer transmission distance are achieved to improve the throughput of the wireless network.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A wireless network transmission system comprising:
   a first transmission device including a control circuit and a plurality of first antennas, the control circuit is electrically connected to the first antennas; and
   at least one second transmission device configured to communicate with the first transmission device;
   wherein the number of the first antennas of the first transmission device is m, each second transmission device includes a second antenna, the total number of the second antennas of the second transmission devices is n, wherein m and n are positive integers that are greater than or equal to 2, and m>n;
   wherein the first antennas receive wireless signals from the second transmission device, the control circuit is configured to compare signal strength of the wireless signal received by each of the first antennas to generate a comparison result and selects at least one of the first antennas to transmit or receive the wireless signals according to the comparison result.

2. The wireless network transmission system according to claim 1, wherein the first antennas of the first transmission device are divided into a first group and a second group, the first group includes the first antennas that correspond and communicate to the n second antennas, the rest of the first antennas that do not correspond and communicate to the n second antennas are the second group.

3. The wireless network transmission system according to claim 2, wherein when the first antennas receive wireless signals from the second transmission devices and the control circuit determines that the signal strength of the wireless signal received by one of the first antennas in the first group is weaker than the signal strength of the wireless signal received by one of first antenna in the second group, the control circuit disables the first antenna in the first group to transmit or receive the wireless signals, and controls the first antenna in the second group to replace the first antenna in the first group to transmit or receive the wireless signals.

4. A wireless network transmission method, adapted to a first transmission device, the first transmission device includes a control circuit and a plurality of first antenna, the control circuit is electrically connected to the first antenna, the method comprising:
   receiving wireless signals by the first antennas of the first transmission device, wherein the first transmission device is configured to communicate with a plurality of second transmission devices, the number of the first antennas of the first transmission device is m, each second transmission device includes a second antenna, the total number of the second antennas of the second transmission devices is n, wherein m and n are positive integers that are greater than or equal to 2, and m>n; and
   comparing signal strength of the wireless signal received by each of the first antennas to generate a comparison result; and
   selecting at least one of the first antennas to transmit or receive the wireless signal according to the comparison result by the control circuit.

5. The wireless network transmission method according to claim 4, wherein the first antennas of the first transmission device are divided into a first group and a second group, the first group includes the first antennas that correspond and communicate to the m second antennas, the second group includes the rest of the first antennas that do not correspond and communicate to the m second antennas.

6. The wireless network transmission method according to claim 5, wherein when the first antennas receive wireless signals from the second transmission devices and the control circuit determines that signal strength of the wireless signals received by one of the first antennas in the first group is weaker than the signal strength of the wireless signals received by one of the first antennas in the second group, the control circuit disables the first antenna in the first group to transmit or receive the wireless signals, and controls the first antenna in the second group to replace the first antenna in the first group to transmit or receive the wireless signals.

7. A transmission device, configured to be communicated with at least another transmission device, the transmission device comprising:
a plurality of first antennas, wherein the number of the first antennas of the transmission device is m, each of another transmission device includes a second antenna, the total number of the second antennas is n, m and n are positive integers that are greater than or equal to 2, and m>n; and
a control circuit electrically connected to the first antenna;
wherein the first antennas receive wireless signals, and the control circuit is configured to compare signal strength of the wireless signal received by each of the first antennas to generate a comparison result, and at least one of the first antennas is selected to transmit or receive the wireless signals according to the comparison result.

8. The transmission device according to claim 7, wherein the first antennas of the transmission device are divided into a first group and a second group, the first group includes the first antennas that correspond and communicate to the m second antennas, the second group includes the rest of the first antennas that do not correspond and communicate to the m second antennas.

9. The transmission device according to claim 8, wherein when the first antennas receive wireless signals from the another transmission device and the control circuit determines that signal strength of the wireless signals received by one of the first antennas in the first group is weaker than the signal strength of the wireless signals received by one of the first antennas in the second group, the control circuit disables the first antenna in the first group to transmit or receive the wireless signals, and controls the first antenna in the second group to replace the first antenna in the first group to transmit or receive the wireless signals.

* * * * *